(12) United States Patent
DeGowske et al.

(10) Patent No.: US 9,890,819 B2
(45) Date of Patent: Feb. 13, 2018

(54) HYDRAULICALLY OPERATED CLUTCH ACTUATOR

(71) Applicant: American Axle & Manufacturing, Inc., Detroit, MI (US)

(72) Inventors: Robert J. DeGowske, Three Rivers, MI (US); Paul J. Valente, Berkley, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 79 days.

(21) Appl. No.: 15/017,836

(22) Filed: Feb. 8, 2016

(65) Prior Publication Data

US 2016/0230816 A1 Aug. 11, 2016

Related U.S. Application Data

(60) Provisional application No. 62/114,649, filed on Feb. 11, 2015.

(51) Int. Cl.
*F16D 25/08* (2006.01)
*F16D 11/10* (2006.01)
*F16D 48/02* (2006.01)

(52) U.S. Cl.
CPC ............ *F16D 25/083* (2013.01); *F16D 11/10* (2013.01); *F16D 48/02* (2013.01)

(58) Field of Classification Search
CPC .. F16D 11/10; F16D 2011/002; F16D 25/082; F16D 25/083; F16D 48/02; F16D 2048/0212; B60K 17/34–17/35
See application file for complete search history.

(56) References Cited

U.S. PATENT DOCUMENTS

| | | | |
|---|---|---|---|
| 6,079,539 A * | 6/2000 | Fetcho et al. | F16D 11/10 192/69.9 |
| 6,609,646 B2 | 8/2003 | Miller et al. | |
| 7,445,106 B2 | 11/2008 | Capito | |
| 7,743,899 B2 | 6/2010 | Capito | |
| 7,837,587 B2 | 11/2010 | Millar | |
| 8,083,041 B2 | 12/2011 | Capito et al. | |
| 8,167,758 B2 | 5/2012 | Downs et al. | |
| 8,197,386 B2 | 6/2012 | Capito | |
| 8,550,953 B2 | 10/2013 | Valente et al. | |
| 8,784,254 B2 | 7/2014 | Zink et al. | |

(Continued)

*Primary Examiner* — Richard Lorence
(74) *Attorney, Agent, or Firm* — Harness, Dickey & Pierce, P.L.C.

(57) ABSTRACT

A clutched device including an actuator and a clutch. The actuator can include a housing and a piston having a first, second, and third face. The first face and the housing can define a first chamber. The second face and the housing can define a second chamber. The second face can have a greater surface area than the first face. The third face and the housing can define a third chamber, isolated from the first and second chambers. A conduit can couple the first and second chambers. A vent can be coupled to the third chamber. A pump can pump fluid from a reservoir to the first chamber. A valve can selectively inhibit fluid communication between the second chamber and the reservoir. A shift element can be coupled to the piston for common translation and can move a clutch member between first and second positions.

17 Claims, 4 Drawing Sheets

(56) References Cited

U.S. PATENT DOCUMENTS

| | | |
|---|---|---|
| 9,062,744 B2 | 6/2015 | Valente et al. |
| 9,163,715 B2 | 10/2015 | Valente |
| 9,249,873 B2 | 2/2016 | Pump et al. |
| 2009/0093333 A1 | 4/2009 | Adams, III et al. |
| 2015/0057123 A1 | 2/2015 | Phelps et al. |
| 2015/0219170 A1* | 8/2015 | Brooks .................. B60K 17/02 475/225 |

* cited by examiner

HYDRAULICALLY OPERATED CLUTCH ACTUATOR

CROSS-REFERENCE TO RELATED APPLICATIONS

This application claims the benefit of U.S. Provisional Application No. 62/114,649 filed Feb. 11, 2015, the disclosure of which is incorporated by reference as if fully set forth in detail herein.

FIELD

The present disclosure relates to a hydraulically operated clutch actuator.

BACKGROUND

This section provides background information related to the present disclosure and is not necessarily prior art.

Power transmitting devices, such as clutches or transmissions for example, often require linear motion to translate one or more power transmitting elements, such as shift collars for example, into or out of engagement positions. These engagement positions can selectively connect or disconnect a vehicle axle, such as switching between two and four-wheel (or all-wheel) drive modes for example. The engagement positions can alternatively switch between transmission gears, such as between low and high speed gear ratios for example. Various types of linear actuators exist to create such linear motion, such as hydraulic rams, rack and pinion gearing, or solenoids for example. However, there remains a need in the art for an improved actuator for providing linear motion in power transmitting devices.

SUMMARY

This section provides a general summary of the disclosure, and is not a comprehensive disclosure of its full scope or all of its features.

The present teachings provide for a clutched device including a vehicle component and an actuator. The vehicle component can include a first member, a second member, and a clutch. The first and second members can be rotatable about an axis. The clutch can have a clutch member that can be movable along the axis between a first clutch position and a second clutch position. The clutch can be configured to transmit rotary power between the first and second members when the clutch member is in the first clutch position. The clutch can be configured to decouple the first and second members when the clutch member is in the second clutch position. The actuator can include a housing, a piston, a conduit, a vent, a reservoir, a pump, a valve, and a shift element. The piston can be slidably received within the housing and translatable along the axis. The piston can have a first piston face, a second piston face, and a third piston face. The first piston face and the housing can define a first chamber. The second piston face and the housing can define a second chamber. The second piston face can have a greater surface area than the first piston face. The third piston face and the housing can define a third chamber that can be fluidly isolated from the first and second chambers. The conduit can fluidly couple the first and second chambers. The vent can be coupled for fluid communication with the third chamber. The reservoir can be configured to hold a hydraulic fluid. The pump can be coupled for fluid communication with the reservoir and the first chamber. The pump can be configured to pump fluid from the reservoir to the first chamber. The valve can be configured to selectively inhibit fluid communication between the second chamber and the reservoir. The shift element can be coupled to the piston for common translation with the piston. The shift element can be configured to move the clutch member between the first and second clutch positions.

The present teachings further provide for a clutched device including a vehicle component and an actuator. The vehicle component can include a first member, a second member, and a clutch. The first and second members can be rotatable about an axis. The clutch can have a clutch member that can be movable along the axis between a first clutch position and a second clutch position. The clutch can be configured to transmit rotary power between the first and second members when the clutch member is in the first clutch position. The clutch can be configured to decouple the first and second members when the clutch member is in the second clutch position. The actuator can include a housing, a piston, a conduit, a vent, a reservoir, a pump, a valve, and a shift element. The housing can define a first cavity and a second cavity that can have a larger outer diameter than the first cavity. The piston can have an annular shape that can be coaxial with the axis. The piston can be axially translatable within the housing. The piston can include a first ring and a second ring. The first ring can be slidably received within the first cavity. The second ring can extend radially outward from the first ring and be slidably received within the second cavity. The conduit can fluidly couple a portion of the first cavity with a first portion of the second cavity. The vent can be coupled for fluid communication with a second portion of the second cavity. The second portion of the second cavity can be isolated from the portion of the first cavity and from the first portion of the second cavity by the piston. The reservoir can be configured to hold a hydraulic fluid. The pump can be coupled for fluid communication with the reservoir and the portion of the first cavity. The pump can be configured to pump fluid from the reservoir to the portion of the first cavity. The valve can be configured to selectively inhibit fluid communication between the reservoir and the first portion of the second cavity. The shift element can be coupled to the piston for common translation with the piston. The shift element can be configured to move the clutch member between the first and second clutch positions.

The present teachings further provide for a clutched device including a vehicle component and an actuator. The vehicle component can include a first member, a second member, and a clutch. The first and second members can be rotatable about an axis. The clutch can have a collar. The collar can be disposed about the axis and can be movable along the axis between a first clutch position and a second clutch position. The clutch can be configured to transmit rotary power between the first and second members when the collar is in the first clutch position. The clutch can be configured to decouple the first and second members when the collar is in the second clutch position. The actuator can include a housing, a first piston, a second piston, a conduit, a vent, a reservoir, a pump, a valve, and a shift element. The housing can define a first cavity and a second cavity that can have a larger outer diameter than the first cavity. The first piston can be disposed about the axis and can be axially translatable within the first cavity. The first piston can have a first piston face that partially defines a first chamber. The second piston can be disposed about the axis and can be axially translatable within the second cavity. The second piston can be coupled to the first piston for common axial translation within the housing. The second piston can have a second piston face and a third piston face. The second piston face can partially define a second chamber. The third piston face can partially define a third chamber that can be fluidly isolated from the first and second chambers. The second piston face can have a greater surface area than the first piston face. The conduit can fluidly couple the first and second chambers. The vent can be coupled for fluid communication with the third chamber. The reservoir can be configured to hold a hydraulic fluid. The pump can be coupled for fluid communication with the reservoir and the first chamber. The pump can be configured to pump fluid from the reservoir to the first chamber. The valve can be configured to selectively inhibit fluid communication between the reservoir and the second chamber. The shift element can be coupled to the second piston for common translation with the second piston. The shift element can be configured to move the collar between the first and second clutch positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
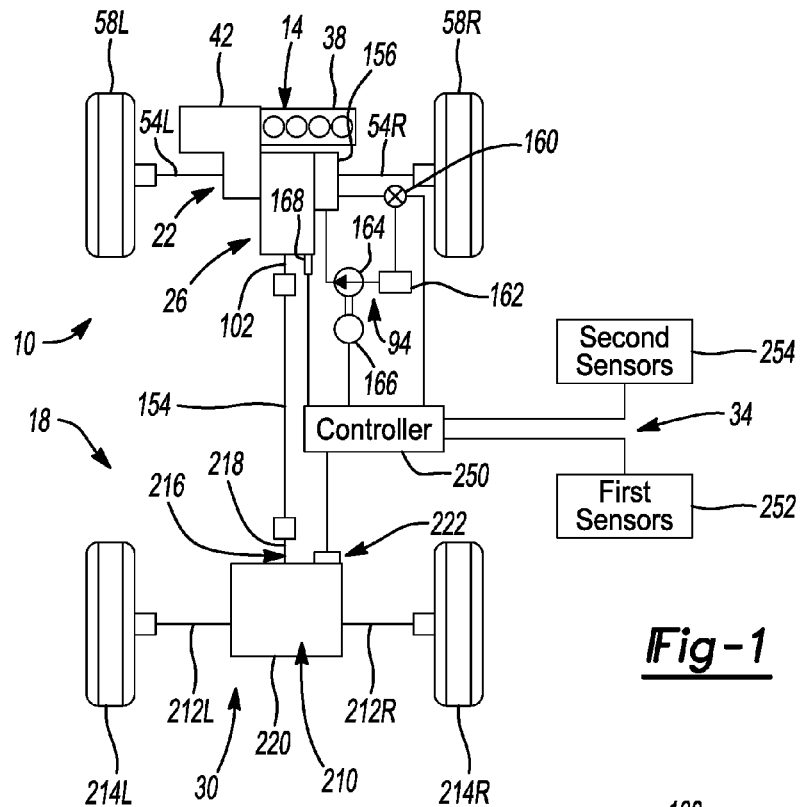
FIG. 1 is a schematic of a motor vehicle having a disconnectable all-wheel drive system with a power transmitting device constructed in accordance with the teachings of the present disclosure.
Figure 2:
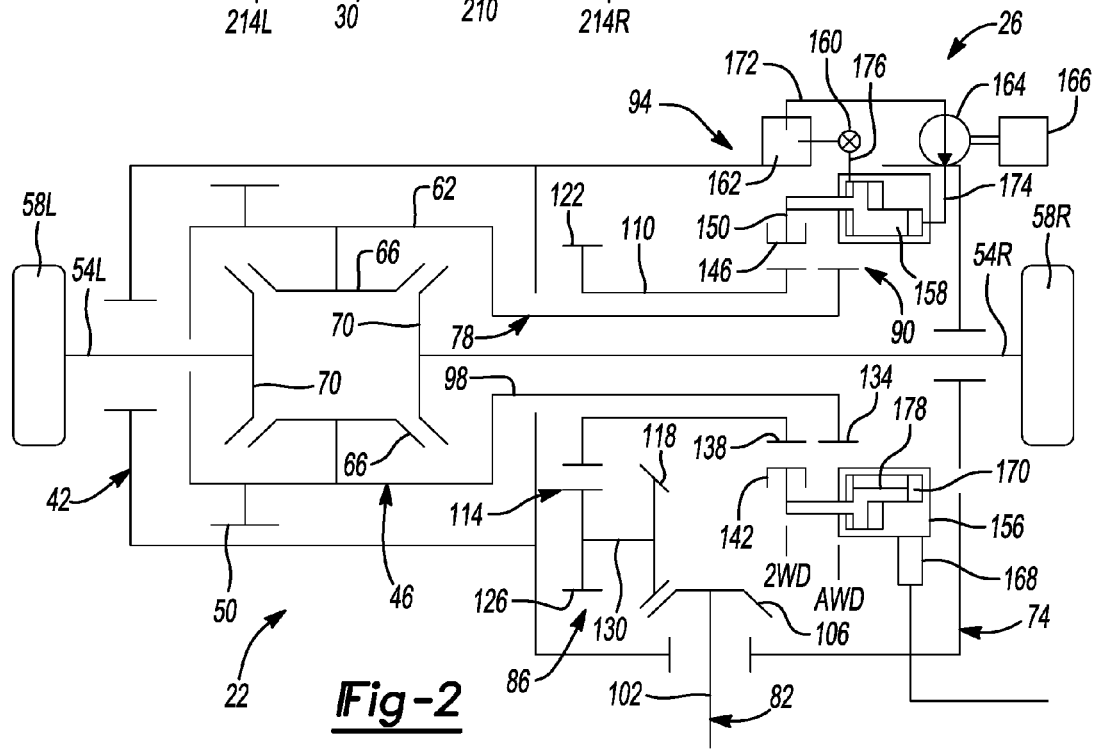
FIG. 2 is a schematic illustration of a portion of the motor vehicle of FIG. 1, illustrating the power transmitting device in more detail.

With reference to FIGS. 1 and 2 of the drawings, a motor vehicle constructed in accordance with the teachings of the present disclosure is schematically shown and generally indicated by reference numeral 10. The vehicle 10 can include a powertrain 14 and a drivetrain 18 that can include a primary driveline 22, a power switching mechanism 26, a secondary driveline 30, and a control system 34. In the various aspects of the present teachings, the primary driveline 22 can be a front driveline while the secondary driveline 30 can be a rear driveline.

The powertrain 14 can include a prime mover 38, such as an internal combustion engine or an electric motor, and a transmission 42 which can be any type of ratio-changing mechanism, such as a manual, automatic, or continuously variable transmission. The prime mover 38 is operable to provide rotary power to the primary driveline 22 and the power switching mechanism 26.

In FIG. 2, the primary driveline 22 can include a primary or first differential 46 having an input member 50 driven by an output member (not shown) of the transmission 42. In the particular example shown, the first differential 46 is configured as part of the transmission 42, a type commonly referred to as a transaxle and typically used in front-wheel drive vehicles. The primary driveline 22 can further include a pair of first axleshafts 54L, 54R that can couple output components of the first differential 46 to a set of first vehicle wheels 58L, 58R. The first differential 46 can include a first differential case 62 that is rotatably driven by the input member 50, at least one pair of first pinion gears 66 rotatably driven by the first differential case 62, and a pair of first side gears 70. Each of the first side gears 70 can be meshed with the first pinion gears 66 and drivingly coupled to an associated one of the first axleshafts 54L, 54R.

The power switching mechanism 26, hereinafter referred to as a power take-off unit ("PTU"), can generally include a housing 74, an input 78 coupled for common rotation with the first differential case 62 of the first differential 46, an output 82, a transfer gear assembly 86, a disconnect mechanism 90, and a disconnect actuator 94. The input 78 can include a tubular input shaft 98 rotatably supported by the housing 74 and which concentrically surrounds a portion of the first axleshaft 54R. A first end of the input shaft 98 can be coupled for rotation with the first differential case 62. The output 82 can include an output pinion shaft 102 rotatably supported by the housing 74 and having a pinion gear 106. The transfer gear assembly 86 can include a hollow transfer shaft 110, a helical gearset 114, and a hypoid gear 118 that is meshed with the pinion gear 106. The transfer shaft 110 concentrically surrounds a portion of the first axleshaft 54R and is rotatably supported by the housing 74. The helical gearset 114 can include a first helical gear 122 fixed for rotation with the transfer shaft 110 and a second helical gear 126 which is meshed with the first helical gear 122. The second helical gear 126 and/or the hypoid gear 118 can be integrally formed on, or fixed for common rotation with, a stub shaft 130 that is rotatably supported in the housing 74.

The disconnect mechanism 90 can comprise any type of clutch, disconnect or coupling device that can be employed to selectively transmit rotary power from the primary driveline 22 to the secondary driveline 30 (FIG. 1). In the particular example provided, the disconnect mechanism 90 comprises a clutch having a set of external spline teeth 134, which can be formed on a second end of the input shaft 98, a set of external clutch teeth 138, which can be formed on the transfer shaft 110, a mode collar 142 having internal spline teeth 146 constantly meshed with the external clutch teeth 138 on the transfer shaft 110, and at least one shift element 150 operable to axially translate the mode collar 142 between a first mode position and a second mode position. The shift element 150 will be described in greater detail below with reference to FIGS. 3 and 4. It will be appreciated that the clutch could include a synchronizer if such a configuration is desired.

The mode collar 142 is shown in FIG. 2 in its first mode position, identified by a "2WD" leadline, wherein the internal spline teeth 146 on the mode collar 142 are disengaged from the external spline teeth 134 on the input shaft 98. As such, the input shaft 98 is disconnected from driven engagement with the transfer shaft 110. Thus, no rotary power is transmitted from the powertrain 14 to the transfer gear assembly 86 and the output pinion shaft 102 of the PTU 26.

With the mode collar 142 in its second mode position, identified by an "AWD" leadline, its internal spline teeth 146 are engaged with both the external spline teeth 134 on the input shaft 98 and the external clutch teeth 138 on the transfer shaft 110. Accordingly, the mode collar 142 establishes a drive connection between the input shaft 98 and the transfer shaft 110 such that rotary power from the powertrain 14 (FIG. 1) is transmitted through the PTU 26 to the output pinion shaft 102. The output pinion shaft 102 is coupled via a propshaft 154 (FIG. 1) to the secondary driveline 30 (FIG. 1).

The disconnect actuator 94 can include a housing 156, a piston 158, a valve 160, a reservoir 162, a pump 164, and a motor 166. The disconnect actuator 94 can also include a locking device 168. The housing 156 can define a piston chamber 170 disposed concentrically about a portion of the first axle shaft 54R. The piston 158 can be disposed concentrically about a portion of the first axle shaft 54R and can be slidably received within the piston chamber 170, such that the piston 158 can translate axially within the piston chamber 170 between a first piston position and a second piston position. The shift element 150 can be coupled to the piston 158 such that the shift element 150 can translate axially with the piston 158. In this way, translation of the piston 158 between the first and second piston positions causes axial translation of the mode collar 142 between the first and second mode positions.

The reservoir 162 can be configured to hold a volume of fluid, such as a hydraulic fluid. An inlet of the pump 164 can be coupled for fluid communication to the reservoir by a first conduit 172. An outlet of the pump 164 can be coupled for fluid communication to the piston chamber 170 on a first side of the piston 158 by a second conduit 174. The motor 166 can receive control signals from the control system 34 to selectively drive the pump 164 to draw fluid from the reservoir 162 and to pump fluid to the piston chamber 170 through the first and second conduits 172, 174. The reservoir 162 can be coupled to the piston chamber 170 by a third conduit 176, on a second side of the piston 158 that is opposite the first side of the piston 158. The piston 158 can define a bleed conduit 178 that extends through the piston 158 from the first side of the piston 158 to the second side of the piston 158.

The valve 160 can be disposed fluidly inline with the third conduit 176 between the piston chamber 170 and the reservoir 162. The valve 160 can be any type of valve that can be selectively opened and closed to selectively allow or inhibit fluid communication between the reservoir 162 and the piston chamber 170. For example, the valve 160 can be an electronically controlled valve that can be controlled by the control system 34. The reservoir 162, pump 164 and motor 166 can be mounted to the housing 74 of the PTU 26, or can be located remotely relative to the housing 74. It is understood that the reservoir 162, and/or any of the first, second, or third conduits can be fully or partially defined by the housing 74.

The locking device 168 can be configured to lock the piston 158 in the first and/or second piston positions. The disconnect mechanism 90 and actuator 94 are described in greater detail below, with reference to FIGS. 3-6.

Returning to FIG. 1, the secondary driveline 30 can include the propshaft 154, a rear drive module ("RDM") 210, a pair of second axleshafts 212L, 212R, and a set of second vehicle wheels 214L, 214R. A first end of the propshaft 154 can be coupled for rotation with the output pinion shaft 102 extending from the PTU 26 while a second end of the propshaft 154 can be coupled for rotation with an input 216 of the RDM 210. The input 216 can include an input pinion shaft 218. The RDM 210 can be configured to transfer rotational input from the input 216 to the drive axleshafts 212L, 212R. The RDM 210 can include, for example a housing 220, a secondary or second differential (not shown), a torque transfer device ("TTD") (not shown) that is generally configured and arranged to selectively couple and transmit rotary power from the input 216 to the second differential, and a TTD actuator 222. The second differential can be configured to drive the axleshafts 212L, 212R. The TTD can include any type of clutch or coupling device that can be employed to selectively transmit rotary power from the input 216 to the second differential, such as a multi-plate friction clutch for example. The TTD actuator 222 is provided to selectively engage and disengage the TTD, and can be controlled by control signals from the control system 34. The TTD actuator 222 can be any power-operated device capable of shifting the TTD between its first and second modes as well as adaptively regulating the magnitude of the clutch engagement force exerted.

The control system 34 is schematically shown in FIG. 1 to include a controller 250, a group of first sensors 252, and a group of second sensors 254. The group of first sensors 252 can be arranged within the motor vehicle 10 to sense a vehicle parameter and responsively generate a first sensor signal. The vehicle parameter can be associated with any combination of the following: vehicle speed, yaw rate, steering angle, engine torque, wheel speeds, shaft speeds, lateral acceleration, longitudinal acceleration, throttle position, position of shift element 150, position of mode collar 142, position of the piston 158, and gear position without limitations thereto. The controller 250 can include a shift element displacement feedback loop that permits the controller 250 to accurately determine the position of the shift element 150 or of an element associated with the position of the shift element 150. The group of second sensors 254 can be configured to sense a driver-initiated input to one or more on-board devices and/or systems within the vehicle 10 and responsively generate a second sensor signal. For example, the motor vehicle 10 may be equipped with a sensor associated with a mode selection device, such as a switch associated with a push button or a lever, that senses when the vehicle operator has selected between vehicle operation in a two-wheel drive (2WD, e.g. FWD) mode and an all-wheel drive (AWD) mode. Also, switched actuation of vehicular systems such as the windshield wipers, the defroster, and/or the heating system, for example, may be used by the controller 250 to assess whether the motor vehicle 10 should be shifted automatically between the FWD and AWD modes.

The vehicle 10 can normally be operated in the two-wheel drive (2WD, e.g. FWD) mode in which the PTU 26 and the RDM 210 are both disengaged. Specifically, the mode collar 142 of the disconnect mechanism 90 is positioned by the disconnect actuator 94 in its first mode position (2WD) such that the input shaft 98 is uncoupled from the transfer shaft 110. As such, substantially all power provided by the powertrain 14 is transmitted to the primary driveline 22. Likewise, the TTD can be disconnected such that the input 216, the propshaft 154, the output pinion shaft 102 and the transfer gear assembly 86 within the PTU 26 are not back-driven due to rolling movement of the second vehicle wheels 214L, 214R.

When it is desired or necessary to operate the motor vehicle 10 in the all-wheel drive (AWD) mode, the control system 34 can be activated via a suitable input which, as noted, can include a driver requested input (via the mode select device) and/or an input generated by the controller 250 in response to signals from the first sensors 252 and/or the second sensors 254. The controller 250 initially signals the TTD actuator 222 to engage the TTD to couple the input 216 to the axleshafts 212L, 212R. Specifically, the controller 250 controls operation of the TTD actuator 222 such that the TTD is coupled sufficiently to synchronize the speed of the secondary driveline 30 with the speed of the primary driveline 22. Upon speed synchronization, the controller 250 signals the actuator 94 to cause the mode collar 142 in the PTU 26 to move from its first mode position into its second mode position. With the mode collar 142 in its second mode position, rotary power is transmitted from the powertrain 14 to the primary driveline 22 and the secondary driveline 30. It will be appreciated that subsequent control of the magnitude of the clutch engagement force generated by the TTD permits torque biasing for controlling the torque distribution ratio transmitted from the powertrain 14 to the primary driveline 22 and the secondary driveline 30.

Figure 3:
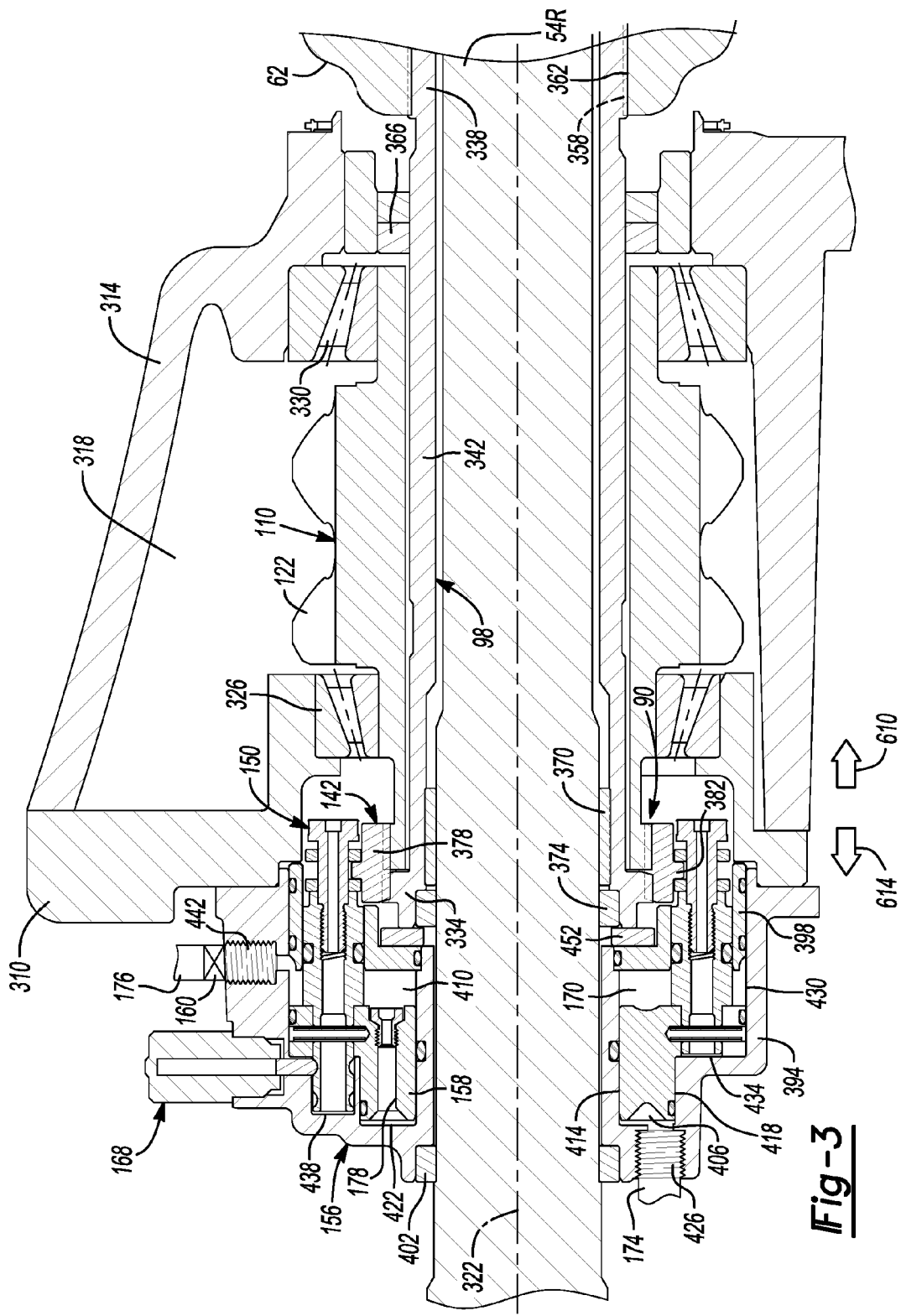
FIG. 3 is a sectional view of a portion of the power transmitting device of FIG. 1, illustrating an actuator and a disconnect mechanism in a connected position.
Figure 4:
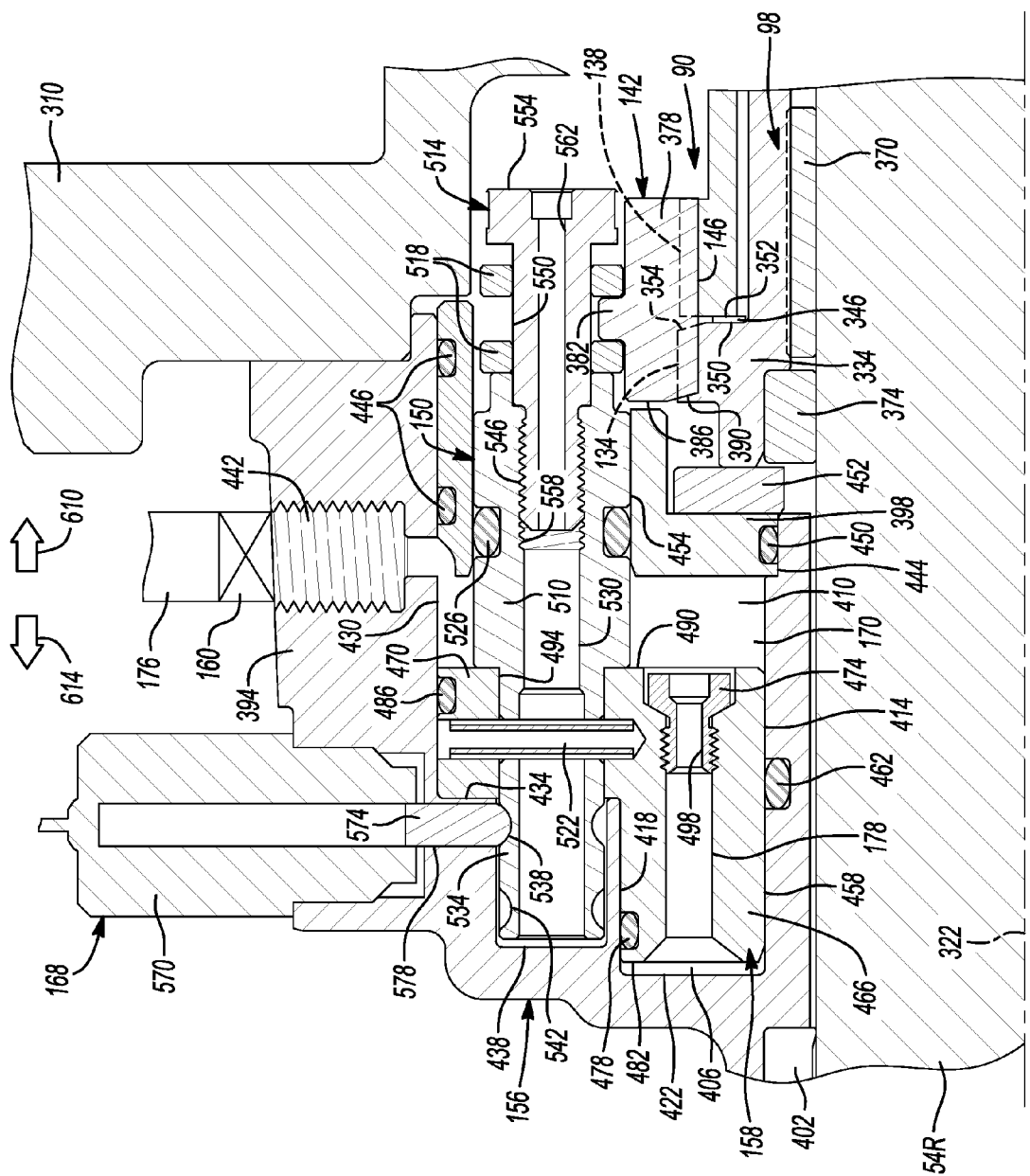
FIG. 4 is a sectional view of a portion of the actuator and the disconnect mechanism of FIG. 3.

With additional reference to FIGS. 3 and 4, a sectional view of a portion of the PTU 26 is illustrated with the mode collar 142 in the second mode position (e.g. AWD). The housing 74 can include a first shell 310 and a second shell 314 that can be fixedly coupled together to define a PTU cavity 318. The transfer shaft 110 can be disposed within the PTU cavity 318 and supported for rotation therein about an axis 322. The transfer shaft 110 can be supported for rotation about the axis 322 by a first bearing 326 and a second bearing 330. The first bearing can be disposed radially between the transfer shaft 110 and a portion of the first shell 310, and axially between the first helical gear 122 and the external clutch teeth 138. The second bearing 330 can be disposed radially between the transfer shaft 110 and a portion of the second shell 314, and axially on an opposite side of the first helical gear 122 as the first bearing 326.

The input shaft 98 can have a first end 334, a second end 338, and a central body 342. The first end 334 can be disposed within the PTU cavity 318 and can define the external spline teeth 134, such that the external clutch teeth 138 are axially between the external spline teeth 134 and the first helical gear 122. A first bushing 346 can be disposed axially between opposing faces 350, 352 of input shaft 98 and the transfer shaft 110. The external spline teeth 134 can include a first chamfer 354 proximate to the external clutch teeth 138. In the example provided, the first chamfer 354 is formed at a 15° angle relative to the face 350 of the input shaft 98.

The second end 338 of the input shaft 98 can be disposed externally of the PTU cavity 318 and can be coupled for common rotation with the differential case 62. In the example provided, the second end 338 defines a set of external spline teeth 358 that meshingly engage a set of internal spline teeth 362, that are defined by the differential case 62. The central body 342 can extend between the first and second ends 334, 338 and can extend through the transfer shaft 110, such that at least a portion of the central body 342 is surrounded by the transfer shaft 110. The central body 342 can be supported for rotation about the axis 322 by a third bearing 366. The third bearing 366 can be disposed radially between the central body 342 and the second shell 314, and axially between the transfer shaft 110 and the second end 338 of the input shaft 98.

The first axle shaft 54R can be supported for rotation about the axis 322 and can extend axially through the housing 74. A portion of the first axle shaft 54R can be surrounded by the input shaft 98 and the transfer shaft 110. The first axle shaft 54R can be supported by a second bushing 370 and/or a fourth bearing 374, which can be disposed radially between the first axle shaft 54R and the input shaft 98.

The mode collar 142 can have a collar body 378 and a shoulder or protrusion 382. The collar body 378 can be disposed concentrically about a portion of the input shaft 98 and a portion of the transfer shaft 110. The collar body 378 can define the internal spline teeth 146 which, as described above with reference to FIG. 2, can meshingly engage with the external spline teeth 134 and the external clutch teeth 138. A first side 386 of the collar body 378 can include a second chamfer 390 that is configured to oppose the first chamfer 354. In the example provided, the second chamfer 390 is formed at a 15° angle relative to the first side 386 of the collar body 378. The protrusion 382 can be fixedly coupled to the collar body 378 and can extend radially outward therefrom. The protrusion 382 can extend around the circumference of the collar body 378.

The housing 156 can include a third shell 394 and an end cap 398. The third shell 394 can be disposed about the axis 322 and can be mounted to the first shell 310 of the PTU 26 housing 74. The first axle shaft 54R can be supported for rotation by a fifth bearing 402 disposed radially between the third shell 394 and the first axle shaft 54R. The third shell 394 can define a first actuator cavity 406 and a second actuator cavity 410. The first actuator cavity 406 can be defined by an inner wall 414, a first outer wall 418, and a first end wall 422. The inner wall 414 and first outer wall 418 can be concentrically disposed about the first axle shaft 54R. The inner wall 414 can have a first diameter and the first outer wall 418 can have a second diameter that is greater than the first diameter. The first end wall 422 can extend generally perpendicular between the inner wall 414 and the first outer wall 418 to couple the inner wall 414 to the first outer wall 418 and define the first actuator cavity 406. The first end wall 422 can include a first port 426 that can be coupled for fluid communication with the second conduit 174 (FIG. 2).

The second actuator cavity 410 can be defined by the first outer wall 418, a second outer wall 430, and a second end wall 434. The inner wall 414 can extend axially beyond the first actuator cavity 406 to at least partially define the second actuator cavity 410. The second outer wall 430 can be concentrically disposed about the first axle shaft 54R. The second outer wall 430 can have a third diameter that is greater than the second diameter of the first outer wall 418. The second end wall 434 can extend between the first outer wall 418 and the second outer wall 430 to couple the first outer wall 418 to the second outer wall 430 and at least partially define the second actuator cavity 410. Thus, the second actuator cavity 410 can have a maximum diameter that is greater than that of the first actuator cavity 406 and can be axially between the first actuator cavity 406 and the first shell 310. The second end wall 434 can also define at least one bore 438. The first and second actuator cavities 406, 410 can be open to each other, and the second actuator cavity 410 can be generally open to the PTU cavity 318. The second outer wall 430 can define a second port 442 that can be coupled for fluid communication with the third conduit 176 (FIG. 2).

Figure 5:
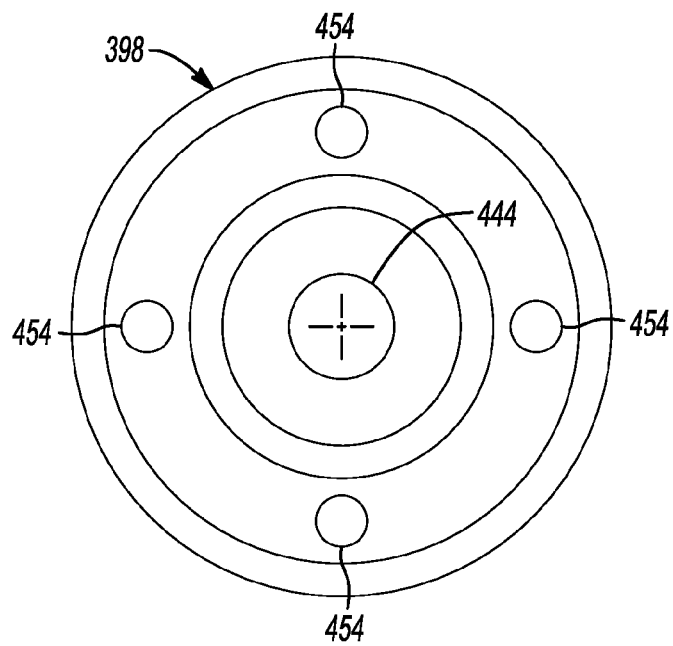
FIG. 5 is a front elevated view of an end cap of the actuator of FIG. 3.

With additional reference to FIG. 5, the end cap 398 can have a generally annular shape that defines a first inner bore 444 that is concentrically disposed about the first axle shaft 54R, and received within the second actuator cavity 410. The end cap 398 can be fixedly coupled to the third shell 394, such as by a plurality of set screws (not shown) extending between the second outer wall 430 and the end cap 398. The end cap 398 can be spaced apart from the second end wall 434, such that the third shell 394 and the end cap 398 can define the piston chamber 170. In the example provided, a pair of first seals 446, such as O-rings, can form a seal between an outer surface of the end cap 398 and the second outer wall 430. A second seal 450, such as an O-ring, can form a seal between an inner surface of the end cap 398 and the inner wall 414. A third bushing 452 can be axially between the end cap 398 and the first end 334 of the input shaft 98. The end cap 398 can define a plurality of first bores 454 that extend axially through the end cap 398. In the example provided, the end cap 398 defines four first bores 454, circumferentially spaced about the end cap 398 at equal intervals.

Figure 6:
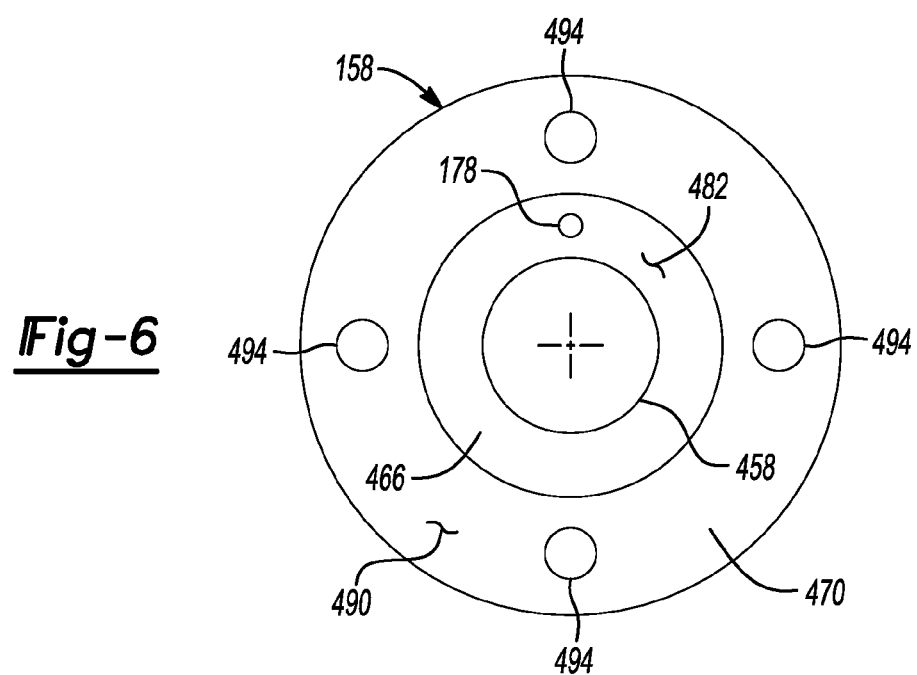
FIG. 6 is a front elevated view of a piston of the actuator of FIG. 3.

With additional reference to FIG. 6, the piston 158 can have a generally annular shape that defines a second inner bore 458 that has a diameter that is greater than the first diameter of the inner wall 414. A third seal 462, such as an O-ring, can form a seal between the inner wall 414 and the inner bore 458. The piston 158 can include a first portion 466 and a second portion 470. The piston 158 can optionally include a throttling insert 474. The first portion 466 can be concentrically and slidably received within the first actuator cavity 406. A fourth seal 478, such as an O-ring, can form a seal between the first portion 466 and the first outer wall 418. The first portion 466 can include a first piston face 482 that generally opposes the first end wall 422.

The second portion 470 can be fixedly coupled to the first portion 466 and can be unitarily formed therewith. The second portion 470 can be concentrically and slidably received within the second actuator cavity 410. A fifth seal 486, such as an O-ring, can form a seal between the second outer wall 430 and the second portion 470. The second portion 470 can include a second piston face 490 that generally opposes the end cap 398, and the piston 158 can define a plurality of second bores 494. The second piston face 490 can have a total surface area that is greater than the total surface area of the first piston face 482. The second bores 494 can align with the first bores 454 of the end cap 398 and can be radially outward of the first portion 466.

The bleed conduit 178 can extend through the piston 158 from the first piston face 482 to the second piston face 490. The throttling insert 474 can be received within the bleed conduit 178 and can have a throttling bore 498 that has a diameter less than the bleed conduit 178. The throttling insert 474 can be threadably coupled to the bleed conduit 178 such that the throttling insert 474 can be replaced or exchanged with other throttling inserts (not shown) having different throttling bores. Thus, the amount of fluid permitted to flow though the bleed conduit can be adjusted by exchanging different throttling inserts 474.

The shift element 150 can include a plurality of cylindrical members 510, a plurality of fasteners 514, and plurality of annular plates 518. The number of cylindrical members 510 can be equal to the number of first and second bores 454, 494, and each cylindrical member 510 can be received through one of the first and second bores 454, 494. Each cylindrical member 510 can be fixedly coupled to the piston 158 for common axial translation with the piston 158. In the example provided, each cylindrical member 510 can be fixedly coupled to the second portion 470 of the piston 158 by a set pin 522 that extends radially through the cylindrical member 510 and the second portion 470 of the piston 158. A sixth seal 526, such as an O-ring, can form a seal between the cylindrical member 510 and the first bore 454 while permitting the cylindrical member to slide axially within the first bore 454. Each cylindrical member 510 can define a central vent 530 that extends the length of the cylindrical member 510 to fluidly couple the part of the second actuator cavity 410 that is between the second end wall 434 and the second portion 470 of the piston 158, with the PTU cavity 318. At least one of the cylindrical members 510 can include a tail portion 534 that extends axially beyond the second portion 470 of the piston 158 and is received in the bore 438 formed in the second end wall 434. The central vent 530 extends through the tail portion 534 to fluidly couple the bore 438 with the PTU cavity 318. The housing 156 and an end face of the second piston portion 510 (i.e., a left end of the second piston portion 510 shown in FIG. 4) cooperate to form a third chamber of which is partly formed by the bore 438 in the housing 156. Due to the presence of the third seal 462 and the fourth seal 478 between the first piston portion 466 and the housing 156, and the fifth seal 486 between the second piston portion 510 and the housing 156, the third chamber (e.g., the bore 438) is fluidly isolated from the first and second chambers 406 and 410. The tail portion 534 can include a first receiver 538 and a second receiver 542. The first and second receivers 538, 542 can be indents, grooves, or apertures for example, formed in the outer surface of the tail portion 534, and spaced apart along the tail portion 534.

The fasteners 514 and annular plates 518 can be configured to couple the cylindrical member 510 to the mode collar 142 for common axial translation with the piston 158. In the example provided, each fastener 514 is a shoulder bolt, having a length of external threads 546, a smooth shoulder portion 550, and a head 554. The external threads 546 can matingly engage a series of internal threads 558 formed within the vent 530 of the cylindrical member 510. Each fastener 514 is hollow to define a vent 562 that extends through the length of the fastener 514 to fluidly couple the vent 530 of the cylindrical member 510 with the PTU cavity 318. The shoulder portion 550 extends axially from the cylindrical member 510. Each fastener 514 is surrounded by two of the annular plates 518, which are maintained spaced apart by the protrusion 382 of the mode collar 142. In the example provided, the annular plates 518 are thrust washers. The head 554 can retain the annular plates 518 axially on the shoulder portion 550. The external threads 546 and the shoulder portion 550 can be configured to prevent the head 554 from compressing the annular plates. Thus, each annular plate 518 is permitted to rotate freely about the fastener 514 and can act as a bearing between the mode collar 142 and the fastener 514.

The locking device 168 can be any suitable device configured to lock the piston 158 in the first and/or second piston positions. In the example provided, the locking device 168 is a solenoid 570 configured to move a plunger 574 between a locked position (shown in FIGS. 3 and 4) and an unlocked position (not shown). The solenoid 570 is mounted to the third shell 394 and is configured to selectively move the plunger 574 radially inward through an aperture 578 formed in the third shell 394. The aperture 578 extends radially inward into the bore 438. In the locked position, the plunger 574 is received in one of the first and second receivers 538, 542 to inhibit axial movement of the tail portion 534 and thus inhibit axial movement of the piston 158. In the unlocked position, the plunger 574 is retracted from the first and second receivers 538, 542 to permit axial movement of the piston 158. The first receiver 538 is configured to align with the aperture 578 when the piston 158 is in the first piston position. The second receiver 542 is configured to align with the aperture 578 when the piston 158 is in the second piston position. In this way, the locking device 168 can lock the disconnect mechanism 90 in the first and second mode positions. It is appreciated that the receivers 538, 542 can alternatively be formed in the piston 158. In an alternate construction, not specifically shown, the locking device 168 can be a detent device, such that the plunger 574 is biased toward the locked position and sufficient axial force of the piston 158 can cause the plunger 574 to move toward the unlocked position.

In operation, the actuator 94 can be operated to selectively move the mode collar 142 between the first mode position (e.g. 2WD, schematically shown in FIG. 2) and the second mode position (e.g. AWD, shown in FIGS. 3 and 4). When moving from the second mode position to the first mode position, the controller 250 can send control signals to cause the solenoid 570 to move the plunger 574 to the unlocked position. The controller 250 can also open the valve 160 to permit fluid communication between the piston chamber 170 and the reservoir 162 through the second port 442. Control signals from the controller 250 can also cause the motor 166 to drive the pump 164. Operation of the pump 164 can pump fluid through the first port 426, and into the piston chamber 170. The pump 164 can be operated to pump fluid at a volumetric flow rate such that fluid can enter the first actuator cavity 406 at a faster rate than it can exit the first actuator cavity 406, through the bleed conduit 178, to the portion of the second actuator cavity 410 between the piston 158 and the end cap 398. Thus, the pressure acting on the first piston face 482 can increase. The second port 442 and third conduit 176 are configured to permit fluid flow at a greater volumetric flow rate than the bleed conduit 178. Thus, when the valve 160 is open, the force acting on the second piston face 490 is negligible or less than the force acting on the first piston face 482.

This imbalance of forces can cause the piston 158 to translate in a first axial direction 610 to move the piston 158 from the second piston position to the first piston position. Motion of the piston 158 in the first axial direction 610 can cause a vacuum effect in the area of the second actuator cavity 410 between the second end wall 434 and the second portion 470 of the piston 158. This vacuum effect can also be created in the bore 438. This vacuum effect can draw fluid and/or air from the PTU cavity 318, through the vent 530 of the cylindrical member 510.

Motion of the piston 158 in the first axial direction 610 translates the shift element 150 in the first axial direction 610, causing the annular plates 518 to contact the protrusion 382 to push the mode collar 142 in the first axial direction 610. The piston 158 can continue to move in the first axial direction 610 until the mode collar 142 is in the first mode position (e.g. 2WD) and decoupled from the input shaft 98. When in the first mode position, the solenoid 570 can be operated to move the plunger 574 into the locked position within the second receiver 542. With the plunger 574 received in the second receiver 542, power to the motor 166 can be shut off and the mode collar 142 will remain in the first mode position.

When moving from the first mode position to the second mode position, the controller 250 can send control signals to cause the solenoid 570 to move the plunger 574 to the unlocked position. The controller 250 can also close the valve 160 to inhibit fluid communication between the piston chamber 170 and the reservoir 162 through the second port 442. Control signals from the controller 250 can also cause the motor 166 to drive the pump 164. Operation of the pump 164 can pump fluid through the first port 426, and into the piston chamber 170, which can flow through the bleed conduit 178. With the valve 160 closed, the pressure within the second actuator cavity 410, between the second piston face 490 and the end cap 398, can equalize with the pressure in the first actuator cavity 406. Since the pressures acting on the first and second piston faces 482, 490 are equal, but the surface area of the second piston face 490 is greater than the surface area of the first piston face 482, the force acting on the second piston face 490 is greater than the force acting on the first piston face 482. Thus, the net force acting on the piston 158 is in a second axial direction 614 that is opposite the first axial direction 610.

This imbalance of forces can cause the piston 158 to translate in the second axial direction 614 to move the piston 158 from the first piston position to the second piston position. Motion of the piston 158 in the second axial direction 614 can displace fluid and/or air present in the area between the second end wall 434 and the second portion 470 of the piston 158, as well as in the bore 438. This displacement can push this fluid and/or air through the vent 530 of the cylindrical member 510, into the PTU cavity 318.

Motion of the piston 158 in the second axial direction 614 translates the shift element 150 in the second axial direction 614, causing the annular plates 518 to contact the protrusion 382 to pull the mode collar 142 in the second axial direction 614. As the mode collar 142 moves in the second axial direction 614, but before reaching the second mode position, the first chamfer 354 can contact the second chamfers 390. Since the input shaft 98 is rotating, contact between the first and second chamfers 354, 390 can have a synchronizing effect to cause the mode collar 142 to rotate at a similar speed as the input shaft 98 before engagement of the external spline teeth 134 and the internal spline teeth 146. The piston 158 can continue to move in the second axial direction 614 until the mode collar 142 is in the second mode position (e.g. AWD) and is coupled to the input shaft 98. When in the second mode position, the solenoid 570 can be operated to move the plunger 574 into the locked position within the first receiver 538. With the plunger 574 received in the first receiver 538, power to the motor 166 can be shut off and the mode collar 142 will remain in the second mode position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A clutched device comprising:
  a vehicle component including:
    a first member and a second member that are rotatable about an axis; and
    a clutch having a clutch member that is movable along the axis between a first clutch position and a second clutch position, wherein the clutch is configured to transmit rotary power between the first and second members when the clutch member is in the first clutch position, and wherein the clutch is configured to decouple the first and second members when the clutch member is in the second clutch position; and
  an actuator including:
    a housing;
    a piston that is slidably received within the housing and translatable along the axis, the piston having a first piston portion and a second piston portion, the first piston portion having a first piston face and a second piston face, wherein the first piston face and the housing define a first chamber, wherein the second piston face and the housing define a second chamber and the second piston face has a greater surface area than the first piston face, wherein the second piston portion has a third piston face, and wherein the third piston face and the housing define a third chamber that is fluidly isolated from the first and second chambers;
    a conduit that fluidly couples the first and second chambers;
    a vent coupled for fluid communication with the third chamber;
    a reservoir configured to hold a hydraulic fluid;
    a pump coupled for fluid communication with the reservoir and the first chamber, and configured to pump fluid from the reservoir to the first chamber;
    a valve configured to selectively inhibit fluid communication between the second chamber and the reservoir; and
    a shift element coupled to the piston for common translation with the piston, and configured to move the clutch member between the first and second clutch positions.

2. The clutched device of claim 1, wherein the first member defines a first set of splines, the second member defines a second set of splines, and the clutch member includes an annular body that defines a third set of splines configured to engage the first and second sets of splines when the clutch member is in the first clutch position, and wherein the third set of splines are disengaged from one of the first and second sets of splines when the clutch member is in the second clutch position to decouple the clutch member from one of the first and second members.

3. The clutched device of claim 2, wherein the annular body defines a first angled face, and the one of the first and second members defines a second angled face, and wherein the second angled face contacts the first angled face when the clutch member is in a third clutch position that is axially between the first and second clutch positions.

4. The clutched device of claim 2, wherein the shift element includes a plurality of cylindrical members that are fixedly coupled to the piston and spaced circumferentially about the clutch member.

5. The clutched device of claim 4, wherein the clutch member includes a shoulder extending radially outward from the annular body and circumferentially about the annular body, and wherein each cylindrical member rotatably supports a first annular plate and a second annular plate, the first and second annular plates being disposed on opposite sides of the shoulder.

6. The clutched device of claim 4, wherein at least one of the cylindrical members defines the vent.

7. The clutched device of claim 1, wherein the piston defines the conduit.

8. The clutched device of claim 1, wherein the piston is an annular shaped body disposed about the axis.

9. The clutched device of claim 1, wherein the actuator includes a plunger, the plunger being movable between a locked position and an unlocked position, wherein when the plunger is in the locked position the plunger inhibits axial translation of the piston.

10. A clutched device comprising:
  a vehicle component including:
    a first member and a second member that are rotatable about an axis; and
    a clutch having a clutch member that is movable along the axis between a first clutch position and a second clutch position, wherein the clutch is configured to transmit rotary power between the first and second members when the clutch member is in the first clutch position, and wherein the clutch is configured to decouple the first and second members when the clutch member is in the second clutch position; and an actuator including:
- a housing defining a first cavity and a second cavity that has a larger outer diameter than the first cavity;
- a piston having an annular shape that is coaxial with the axis and axially translatable within the housing, the piston including a first ring and a second ring, the first ring being slidably received within the first cavity, the second ring extending radially outward from the first ring and being slidably received within the second cavity;
- a conduit that fluidly couples a portion of the first cavity with a first portion of the second cavity;
- a vent that is coupled for fluid communication with a second portion of the second cavity, wherein the second portion of the second cavity is isolated from the portion of the first cavity and from the first portion of the second cavity by the piston;
- a reservoir configured to hold a hydraulic fluid;
- a pump coupled for fluid communication with the reservoir and the portion of the first cavity, and configured to pump fluid from the reservoir to the portion of the first cavity;
- a valve configured to selectively inhibit fluid communication between the reservoir and the first portion of the second cavity; and
- a shift element coupled to the piston for common translation with the piston, and configured to move the clutch member between the first and second clutch positions.

11. The clutched device of claim 10, wherein the piston defines the conduit.

12. The clutched device of claim 10, wherein the first member defines a first set of splines, the second member defines a second set of splines, and the clutch member includes an annular body that defines a third set of splines configured to engage the first and second sets of splines when the clutch member is in the first clutch position, and wherein the third set of splines are disengaged from one of the first and second sets of splines when the clutch member is in the second clutch position.

13. The clutched device of claim 12, wherein the annular body of the clutch member defines a first angled face, and the one of the first and second members defines a second angled face, and wherein the second angled face contacts the first angled face when the clutch member is in a third clutch position that is axially between the first and second clutch positions.

14. The clutched device of claim 12, wherein the shift element includes a plurality of cylindrical members that are fixedly coupled to the piston and spaced circumferentially about the clutch member.

15. The clutched device of claim 14, wherein the clutch member includes a shoulder extending radially outward from the annular body and circumferentially about the annular body, and wherein each cylindrical member rotatably supports a first annular plate and a second annular plate, the first and second annular plates being disposed on opposite sides of the shoulder.

16. The clutched device of claim 14, wherein at least one of the cylindrical members defines the vent.

17. The clutched device of claim 10, wherein the actuator includes a plunger, the plunger being movable between a locked position and an unlocked position, wherein when the plunger is in the locked position the plunger inhibits axial translation of the piston.

* * * * *